April 18, 1933.   S. R. MORDEN   1,904,506
COLLAR SUPPORT
Filed Aug. 24, 1931
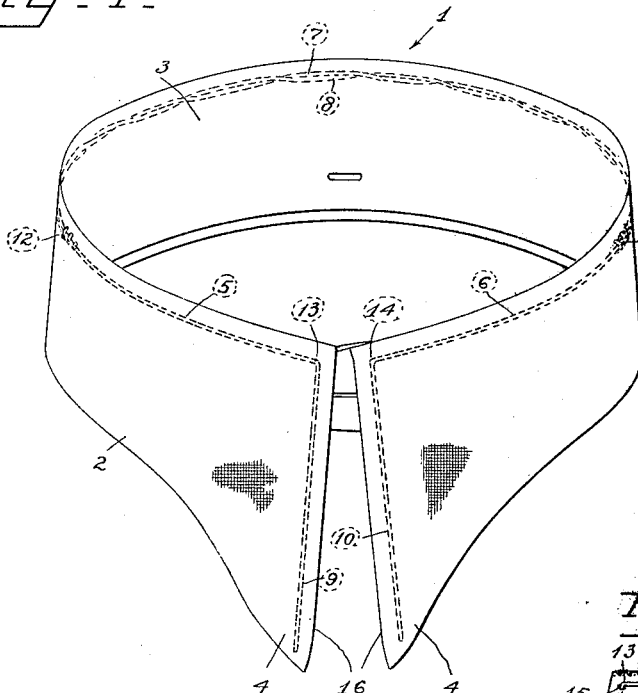
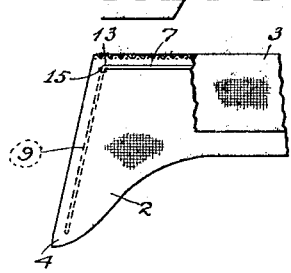
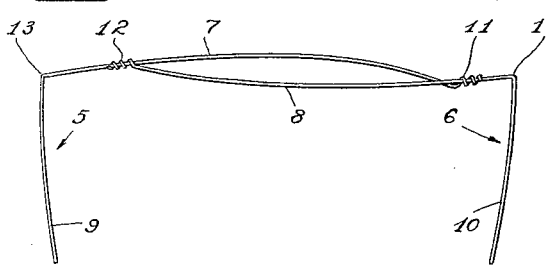
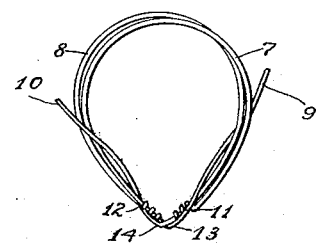
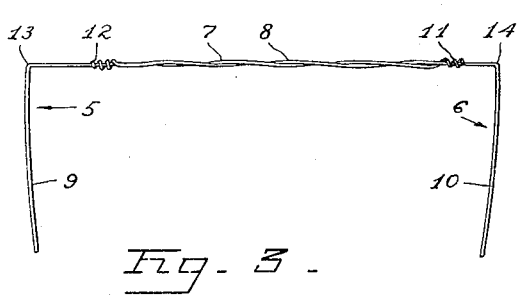
INVENTOR.
STEPHEN R. MORDEN.
BY
Munn & Co.
ATTORNEYS.

Patented Apr. 18, 1933

1,904,506

UNITED STATES PATENT OFFICE

STEPHEN R. MORDEN, OF SAN FRANCISCO, CALIFORNIA

COLLAR SUPPORT

Application filed August 24, 1931. Serial No. 559,062.

My invention relates to improvements in collar supports and it consists of the combinations, constructions and arrangements hereinafter described and claimed.

An object of my invention is to provide a collar support which is extremely simple in construction, consisting of but two wires secured together in a novel manner, and which may be readily and removably secured in a soft or stiff collar, preferably the former, for preventing the tabs curling up. The device may be adjusted to be secured to collars of different sizes and it may be bent into a small circle when not in use so as to be readily shipped.

Other objects and advantages will appear in the following specification, and the novel features of the device will be particularly pointed out in the appended claims.

My invention is illustrated in the accompanying drawing forming a part of this application, in which Figure 1 is a perspective view of a collar showing the device operatively applied thereto;

Figure 2 shows a front elevation of the device and illustrates how the overall length of the device is readily changed;

Figure 3 is a view similar to Figure 2, but shows how the two wire strands of the device may be wrapped around each other for holding the device in adjusted position;

Figure 4 is a rear elevation of a part of the collar, a portion being broken away to illustrate how the device is attached to the collar; and Figure 5 shows the device wrapped into a circle ready for shipment.

In carrying out my invention I make use of a collar 1 which may be either soft or stiff, and which has an outer side 2 and an inner side 3 and points 4. The outer side 2 of the collar, including the points 4, is composed of at least two layers of material. The collar is of standard construction and forms no part of my invention except insofar as it cooperates with the parts now to be described.

In Figure 2 I show the device which comprises two wires 5 and 6, each having an arcuate shaped portion 7 and 8 and a bent portion 9 and 10 respectively. The end of the portion 7 is coiled at 11 around the portion 8 while the end of the portion 8 is coiled at 12 around the portion 7. The distance between the bends 13 and 14 in the device may be adjusted by moving the arcuate portions 7 and 8 with respect to each other so as to lengthen or decrease the over all length of these portions. The wires 5 and 6 are flexible so as to be readily curved when the device is placed within the outer and inner sides 2 and 3 of the collar 1.

In order to prevent the slipping of the coiled portions 11 and 12 the wire 6 is rotated with respect to the wire 5 and this causes the overlapping portions of the wires positioned between the coiled ends 11 and 12 to wind about themselves. The winding of the arcuate portions of the wires causes sufficient friction to be exerted between the wires to prevent accidental movement of one wire with respect to the other.

The device when adjusted in the manner described is now ready to be placed in the collar and the arcuate portions 7 and 8 are placed inside the collar and adjacent to the bend that connects the inner side of the collar with the outer side. The portions 9 and 10 are forced into the collar at 15 and these portions are received between the plies of the points 4 and extend along the edges 16 of the points a distance sufficient to provide a support for the points to prevent their curling. The entire device is invisible when the collar is worn, and the device will bend sufficiently to permit the collar to flex in the usual manner when worn and still the points will be properly supported.

The device will hold the collar in shape even though the collar should become damp.

The device is removed and the collar may be washed in the ordinary manner. Figure 5 shows the device formed into an approximate circle. The coiled portions 11 and 12 are moved to the bends 13 and 14 and then the bends or angled portions 13 and 14 are brought into registration, whereupon the end portions 9 and 10 may be wound around portions of the arcuate shaped parts 7 and 8. In this way the device is held in a small compact size and may be carried in the pocket or placed in a small package for shipping.

While I have shown only the preferred form of my invention, it should be understood that various changes or modifications may be made within the scope of the appended claims without departing from the spirit of the invention.

I claim:

1. A collar support comprising two flexible wires having arcuate neck encircling portions, the end of each of said portions being slidably secured to the other one and the free end of each wire extending at an angle with respect to the arcuate portion and designed to support a collar point.

2. A collar support comprising two flexible wires having overlapping neck encircling portions, one end of each of said portions being slidably connected to the other for permitting adjustment as to length, the overlapping portions being made to be twined around each other for preventing accidental longitudinal movement between the wires.

STEPHEN R. MORDEN.